United States Patent [19]
Bigbee, III

[11] 3,876,921
[45] Apr. 8, 1975

[54] INTEGRATED REJUVENABLE ENERGY SYSTEM AND METHOD

[75] Inventor: John Hatton Bigbee, III, Los Angeles, Calif.

[73] Assignee: Christie Electric Corp., Los Angeles, Calif.

[22] Filed: Feb. 4, 1972

[21] Appl. No.: 223,641

[52] U.S. Cl. .................. 320/20; 320/21; 320/39; 323/22 SC; 323/36
[51] Int. Cl. ......... H02j 7/10; G05f 1/40; G05f 1/52
[58] Field of Search............ 323/22 SC, 21, 36, 39, 323/30; 320/DIG. 2, 39, 40, 21, 28

[56] References Cited
UNITED STATES PATENTS

| | | | |
|---|---|---|---|
| 1,743,594 | 1/1930 | Broadfoot | 320/21 |
| 3,417,312 | 12/1968 | Someda | 320/DIG. 2 |
| 3,437,905 | 4/1969 | Healey et al. | 320/DIG. 2 |
| 3,452,264 | 6/1969 | Turtle | 323/36 X |
| 3,471,771 | 10/1969 | Mortimer | 320/DIG. 2 |
| 3,493,848 | 2/1970 | Galloway | 323/36 X |
| 3,556,849 | 1/1971 | Oswin et al. | 320/21 X |
| 3,590,358 | 6/1971 | Ruben | 320/39 |

Primary Examiner—J. D. Miller
Assistant Examiner—Robert J. Hickey
Attorney, Agent, or Firm—Burns, Doane, Swecker & Mathis

[57] ABSTRACT

An integrated battery and charging circuit and method of battery charging in which a nickel cadmium battery pack may be connected to a standard 115 volt, 60 Hertz power supply and charging current supplied to the battery through a silicon controlled rectifier for a small portion of each of the positive half-cycles of the current from the 60 Hertz power supply. SCR conduction is controlled as a function of battery terminal voltage and/or temperature.

11 Claims, 7 Drawing Figures

INTEGRATED REJUVENABLE ENERGY SYSTEM AND METHOD

BACKGROUND OF THE INVENTION

The present invention is related to an integrated rejuvenable energy system and more particularly to an integrated battery and charging circuit as well as the method employed in such system for effecting the rapid charging of storage batteries.

Power supplies today are highly developed and are generally available commercially with a wide range of both voltage and current characteristics. It is inherent in any voltage or current regulation system subjected to varying power supply and/or load conditions that some means of energy storage is required. Inductors and capacitors are customarily used to perform this energy storage function, but the sealed nickel cadmium (Ni-Cad) battery is generally considered superior to both inductors and capacitors, not only in the amount of energy which can be stored per unit of volume, but also in the amount of energy that can be stored per unit of weight and per unit of cost. In addition, the sealed Ni-Cad batteries can provide continued operation during extended periods of line power interruption.

Ni-Cad batteries are, however, often ruined in such service by slow discharge and trickle charge cycles which, when repeated for several charge and discharge cycles, can reduce the energy storage capacity of the battery to about one-tenth of the designed characteristics.

It is accordingly an object of the present invention to provide a novel voltage and current regulating system employing Ni-Cad batteries in which the charge can be replaced with sufficient rapidity to prevent the loss of energy storage capacity.

In conventional power supplies, isolation of the secondary circuits from the power supply is customarily effected through the utilization of insulating material between the primary and secondary windings of a transformer. The insulation generally takes the form of multiple layers of paper or other insulating material impregnated with varnish or resins and adds to the weight of the transformer.

It is therefore another object of the present invention to provide a novel power supply in which the need for large, heavy and costly transformers has been eliminated.

It is still another object of the present invention to provide a novel integrated rejuvenable energy system and method in which isolation of the secondary circuits from the power supply is achieved by a simple switch.

A second way in which Ni-Cad batteries are ruined is the venting thereof which results from the generation of gas during the charging operation. The venting of the sealed Ni-Cad cell, even though self-resealing, is cumulative and ultimately results in the loss of energy storage capacity. For example, the rapid charging of a Ni-Cad battery from either a direct current or from a half-wave or full-wave rectified alternating current at a rate of 4 times the ampere-hour rating of the battery will usually result in the destructive venting of the battery after only four or five charging and discharging cycles.

It is a further object of the present invention to provide a novel circuit and method for rapidly charging a storage battery.

It is yet another object of the present invention to provide a novel integrated rejuvenable energy system and method having an automatic fast charging and trickle charging circuit.

It is yet still another object of the present invention to provide a novel circuit and method for rapidly charging a battery in which the peak amplitude of charging pulses far exceeding the customary initiation of gas evolution are applied for brief periods of time without creating venting problems in sealed batteries.

These and other objects and advantages of the present invention will be readily apparent to one skilled in the art to which the invention pertains from the appended claims and from the following detailed description when read in conjuction with the drawings.

DETAILED DESCRIPTION

The Circuit of a First Embodiment

Figure 1:
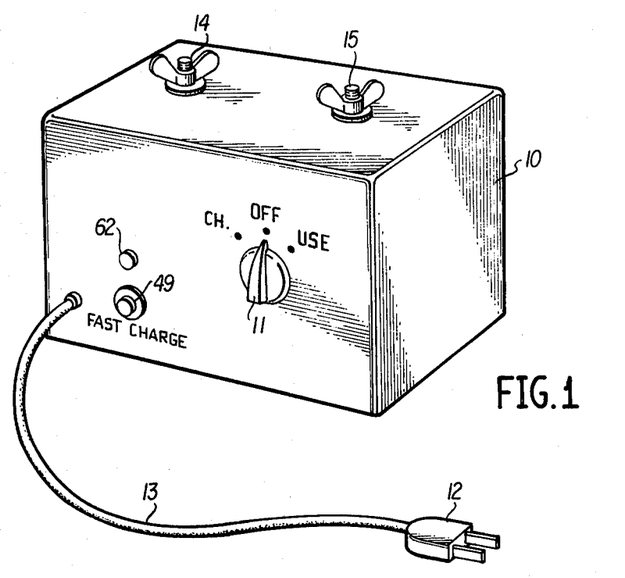
FIG. 1 is a pictorial representation of one embodiment of the integrated power supply and charging circuit of the present invention.

With reference now to FIG. 1, a 10 cell sub-C sealed Ni-Cad battery pack is illustrated within a protective housing 10 with an automatic fast/trickle charging circuit also mounted therein. A manually operated switch 11 may be provided to select either charge (CH.), OFF or USE modes.

The alternating current power to the housing may be provided by a conventional two or three prong plug 12 on the end of a suitable electrical cord 13. The direct current output signal from the battery may conveniently be taken from a pair of terminals 14 and 15.

Figure 2:
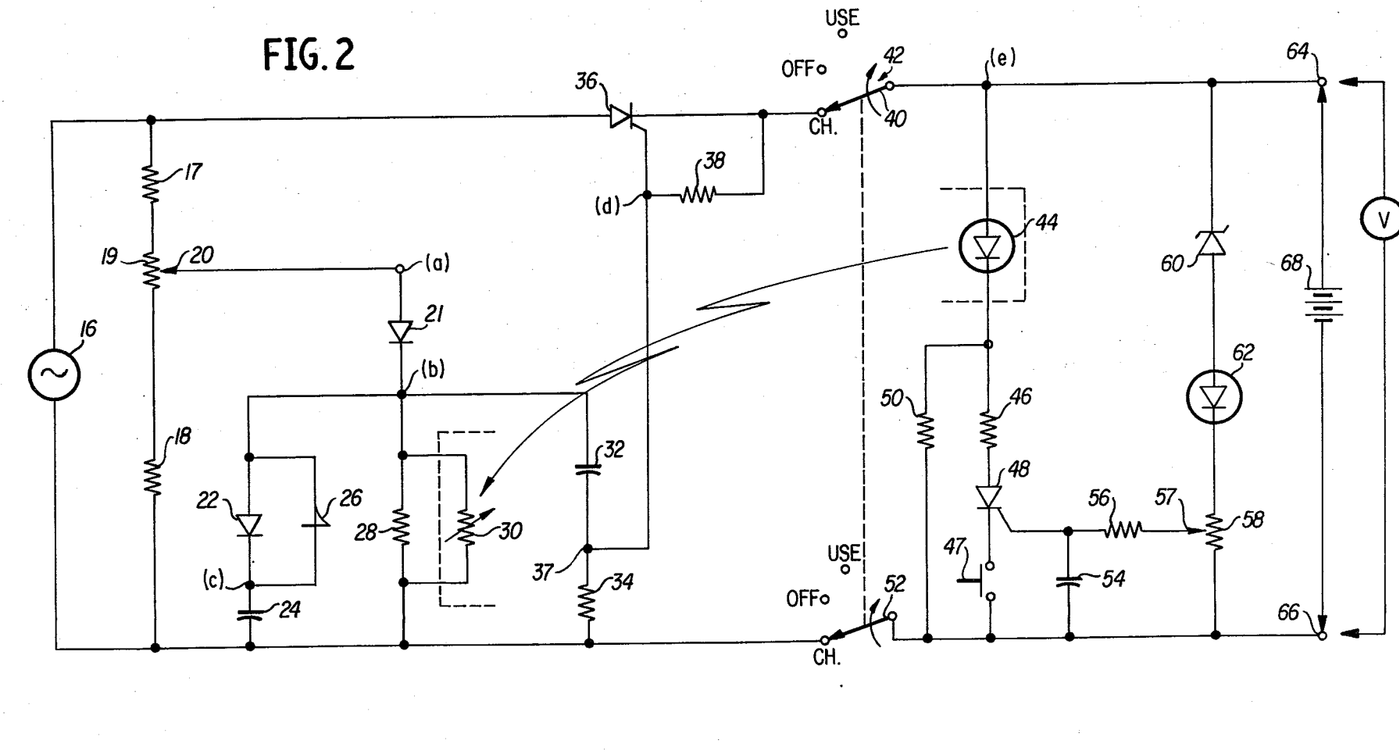
FIG. 2 is a schematic circuit diagram of the circuit of a first embodiment of the present invention.

With reference now to the circuit of FIG. 2, a conventional source of power 16 such as 115 volt, 60 Hertz alternating current is applied across a voltage divider comprising series connected resistors 17 and 18 and potentiometer 19. The slide wire or variable tap 20 of the potentiometer 19 is connected through a diode 21 to a three branch parallel network. In one of the branches of the parallel network, a diode 22 and capacitor 24 are connected in series and the diode 22 is shunted by a trigger diode 26. In the second branch of the parallel network, a resistor 28 is shunted by a radiation variable or photoresistor 30. The third branch of the parallel circuit contains a series connected capacitor 32 and a resistor 34 having the interconnection 37 thereof connected to the trigger electrode of a silicon controlled rectifier or SCR 36.

The trigger electrode of the SCR 36 is connected through a resistor 38 to the cathode electrode thereof which is in turn connected to the charge (CH.) switch contact of one arm 40 of a double pole switch 42. The anode electrode of the SCR 36 is directly connected to the source 16.

Connected in series across the common terminals of the double pole switch 42 is a radiation emitting diode 44, a resistor 46, the anode-cathode path of a second silicon controlled rectifier or SCR 48, and a manually operable switch 47. A resistor 50 is provided to shunt the series connected resistor 46, SCR 48 and switch 47 contacts to the return side of the alternating current source 16.

The trigger electrode of the SCR 48 is connected to the common terminal of the arm 52 of the double pole switch 42 through a capacitor 54. The trigger electrode of the SCR 48 is also connected through a resistor 56 to the slide wire or variable tap 57 of the potentiometer 58.

Also connected in series across the common terminals of the double pole switch 42 is a Zener diode 60 with a radiation emitting diode 62 and the potentiometer 58 earlier discussed. The common terminals of the arms 40 and 52 of the double pole switch 42 are connected to positive and negative terminals of a battery 68 to be charged.

The radiation emitting diode 44 and the radiation responsive resistor 30 earlier described may be enclosed within a light impervious enclosure to ensure the impedance of the resistor 30 solely responsive to the radiation emitted by the diode 44 and to the exclusion of the ambient light.

Operation of the Circuit (Rapid Charge Mode).

Figure 3:
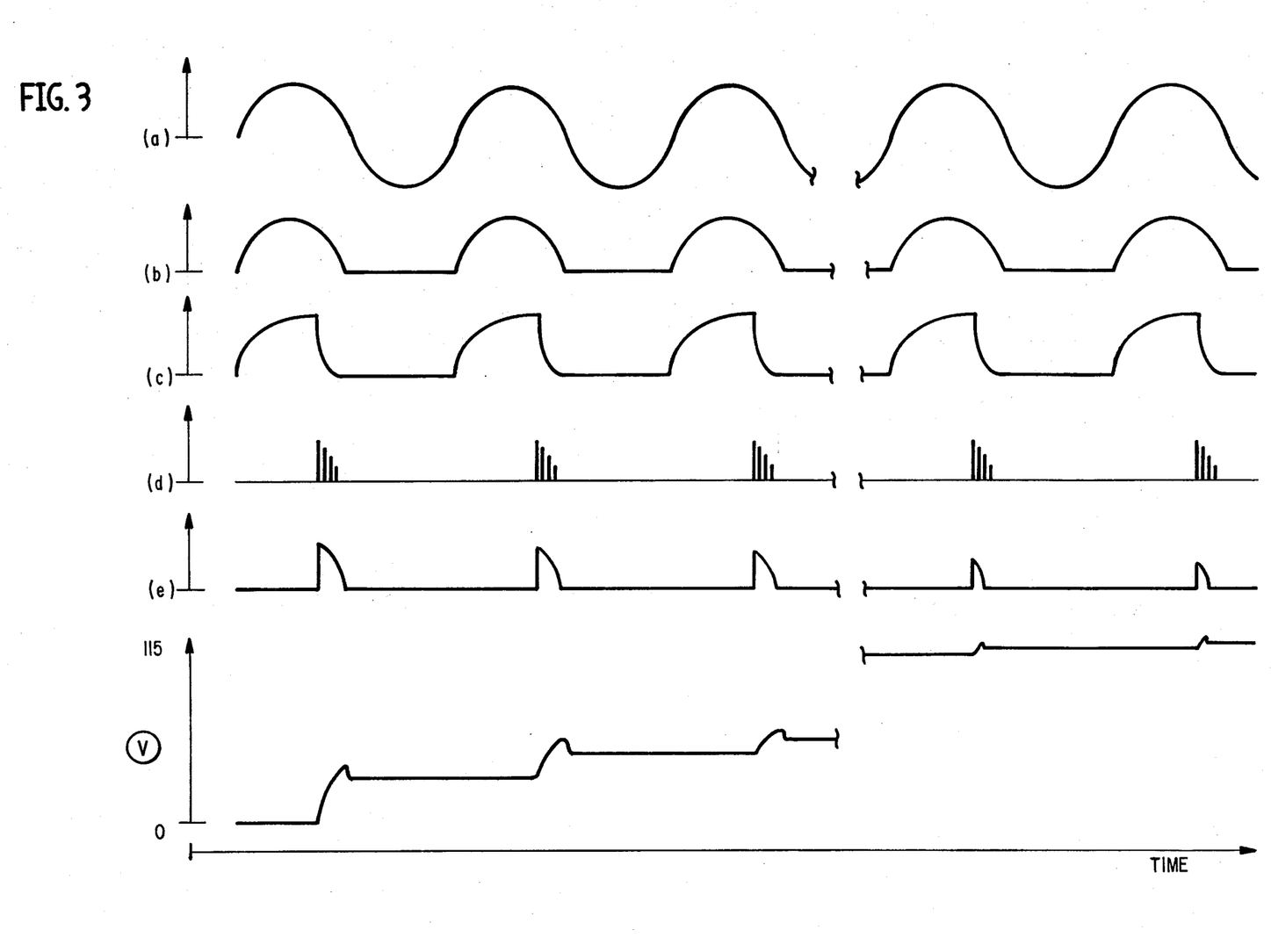
FIG. 3 is a timing diagram illustrating waveforms at selected places in the circuit of FIG. 2.

In operation, and with reference to the waveforms of FIG. 3, the alternating current signal from the source 16 is applied across the voltage divider network comprising resistors 17 and 18 and the potentiometer 19. The signal thus appearing at the slide wire or tap arm 20 of the potentiometer 19 is an alternating current waveform as is illustrated in waveform (a) of FIG. 3. This alternating current signal is applied to the diode 21 where it is half-wave rectified to eliminate the negative half-cycles as is illustrated in waveform (b) in FIG. 3.

The positive half-cycles of the alternating current waveform illustrated in waveform (b) are applied through the diode 22 to the capacitor 24 selected such that it charges completely during each positive half-cycle. The potential across the resistor 28 is a function of the waveform (b) signal and, as the value of the waveform (b) declines during the latter part of each of the applied positive half-cycles, the charge on the capacitor 24 back biases the diode 22 and forward biases the trigger diode 26. When the potential difference of this forward bias of the trigger diode 26 is sufficient to overcome the characteristic trigger potential thereof, the diode 26 conducts to thereby permit the rapid discharge of the capaicitor 24 through the other two parallel branches. The discharge of the capacitor 24, due to the high impedance of the resistor 28 and the photoresistor 30 relative to the impedance of the resistor 34, is through the capacitor 32 and the resistor 34. The result, as seen by the trigger electrode of the SCR 36 from the capacitor 32-resistance 34 connection 37 and illustrated in waveform (d) of FIG. 3, is a rapidly rising waveform having an amplitude sufficient to initiate conduction of the SCR 36.

The SCR 36 is normally maintained in a nonconducting status by the negative potential of the trigger electrode relative to the anode as provided by the voltage divider comprising resistors 34 and 38. The application of the potential across the resistor 34 which results from the discharge of the capacitor 24 into the capacitor 32 is sufficient to insure the conduction of the SCR 36. The time at which conduction of the SCR 36 is initiated is quite late in the positive half-cycles of the alternating current waveform due to the potential difference necessary for the trigger diode 26 to conduct.

The SCR 36 is conventional in its operation and conducts for the remaining portion of the positive half-cycle of the alternating current of waveform (a) following the initiation of conduction by the application of the positive going pulse of waveform (d) to the trigger electrode thereof. As illustrated in waveform (e) in FIG. 3, the current passed by the SCR 36 through the double pole switch 42 when in the CH. position to the battery 68 is that portion of each of the positive half-cycles of the waveform (a) following the application of the trigger pulse illustrated in waveform (d). Thus, as shown in waveform (e), the charging current is intermittent and in the form of discrete pulses.

The battery potential, as measured by a voltmeter connected across the terminals 64 and 66 of the battery 68, also appears across the series combination of the Zener diode 60, the radiation emitting diode 62 and the potentiometer 58. The voltage drop across the Zener diode 60 is a relatively constant value such as 15 volts and the balance of the battery terminal voltage appears across the diode 62 and the potentiometer 58. The flow of current through the diode 62 effects the radiation therefrom and may be used to indicate the operation of the circuit in the fast charging mode as is illustrated in FIG. 1.

Since the current through the radiation emitting diode 44 divides between the resistors 46 and 50 and since the effective resistance of a parallel circuit is less than that of either branch thereof alone, the current through the radiation emitting diode 44 will increase with the conduction of the SCR 48.

The increased radiation emitted by the diode 44 decreases the resistance of the radiation responsive resistor 30 thereby decreasing the resistance of the resistor 28-resistor 30 parallel combination and thus decreasing the charge which capacitor 24 attains each positive half-cycle. Because the peak charge of the capacitor 24 is thus reduced, the attainment of a sufficient potential difference to effect conduction of the trigger diode 26 will occur later in the positive half-cycle of the alternating current of waveform (a) and the amount of current passed through the SCR 36 will ultimately be reduced to an average trickle current value of approximately 100 milliamperes.

The portion of the voltage across the potentiometer 58 picked off by the tap 57 is applied through the thermister 56 and across the capacitor 54 to the trigger electrode of the SCR 48. When the voltage across the potentiometer attains a value representative of a full charge of the battery 68, the voltage across the capacitor 54 will be sufficient to initiate conduction of the SCR 48 and place the circuit in the trickle charge mode. Once the SCR 48 conducts, the current through the radiation emitting diode 44 increases to cause the resistance of the resistor 30 to decrease and the SCR 36 to fire later in the cycle. Inasmuch as the peak voltage across the battery is less, then the current through the diode 62 may be insufficient to effect a visible glow. This reduction in the emitted radiation which accompanies the reduction in current through the diode 62 may be seen as an indication of the trickle charge mode on the battery pack housing as illustrated in FIG. 1.

Operation of the Circuit (Trickle Charge Mode).

The switch 47 in the cathode circuit of the SCR 48 is normally closed. The switch 47 is necessary to stop the conduction of the SCR 48. Due to the positive anode voltage from the battery 68 on the capacitor 54, the SCR 48 will remain conducting even after the transition of the charging circuit into the trickle charge mode in the absence of the opening of the switch 47. This is true even though the voltage across the terminals 64 and 66 of the battery 68 slowly decreases to a nominal value such as 12.5 volts from the value of approximately 14.5 volts maintained during the charging operation. As the battery voltage drops, the Zener diode 60 ceases to conduct thereby removing current through the diode 62 and extinguishing the radiation therefrom. The loss of the illumination may be utilized as indicated in FIG. 1 to indicate that the charging circuit is operating in the trickle charge mode.

Full Charge Verification

The swtich 47 may be operated manually to verify that the battery 68 is fully charged. The opening of the cathode circuit of the SCR 48 immediately interrupts conduction to again place the charging circuit in the rapid charge mode. The decreased current through the diode 44 will effect less radiation thereby increasing the resistance of the radiation responsive resistor 30. The charge on the battery 68 will rapidly increase in the rapid charge mode until the average voltage across the terminals 64 and 66 of the battery 68 approaches 15.5 volts at which time the circuit will automatically revert to the trickle charge mode.

Isolation

The double pole switch 42 is effective to isolate the battery circuit of the present invention from the alternating current source inasmuch as it is necessary to move the switch arms 40 and 42 from the charge (CH.) position through the OFF position to a USE position from which the charge on the battery 68 may be utilized. There is thus no possibility that the direct current terminals will be subjected to a surge of current from the alternating current source 16 during one of the positive half-cycles thereof. The removal of the source from the battery circuit and the circuits to which the battery may be connected in the USE mode thereby protecting personnel from accidental shock.

Exemplary Circuit Components

Exemplary values of the circuit components illustrated in FIG. 2 are listed below for a Ni-Cad battery pack for batteries ranging from size 1/3 AA to 20F.

| | |
|---|---|
| Resistor 17 | 5k ohms |
| Resistors 18, 28 | 10k ohms |
| Resistors 34, 56 | 1k ohms |
| Resistor 38 | 180 |
| Resistor 46 | 4.7k |
| Potentiometer 19 | 2k |
| Potentiometer 58 | 100 ohms |
| Capacitors 24, 32, 54 | 50 v. .01 microfarads |
| Diodes 21, 22 | IN 4005 |
| Diode 26 | TI-42 |
| Diodes 44, 62 | MLED 600 |
| Resistor 30 | VT 10L |
| SCR 36 | 2N 4442 |
| SCR 44 | 2N 5060 |
| Resistor 50 | 100K |

The Circuit of a Second Embodiment

Figure 4:
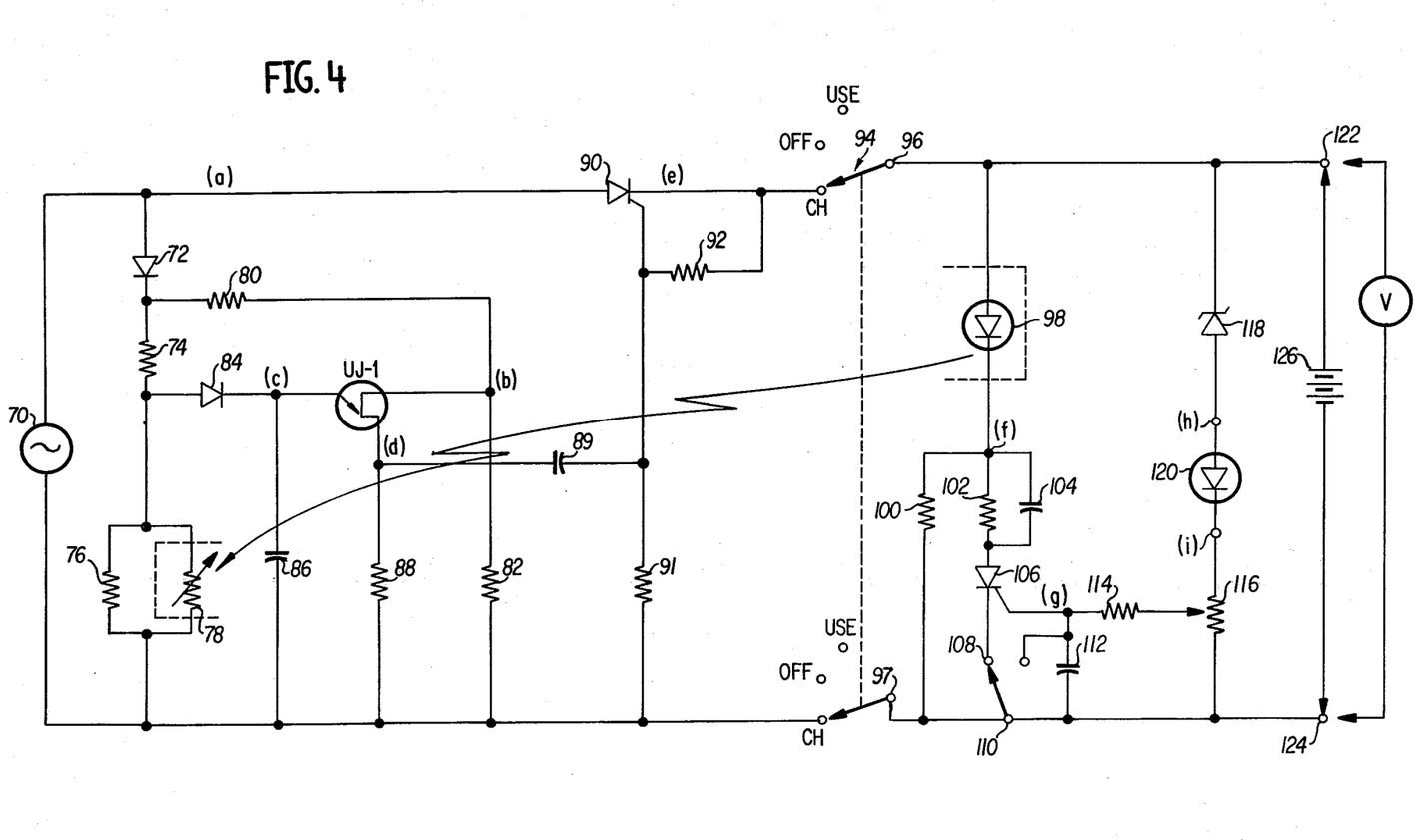
FIG. 4 is a schematic diagram of the circuit of a second embodiment of the present invention.

An alternative to the circuit of FIG. 2 is illustrated in FIG. 4. With reference now to the circuit of FIG. 4, a conventional source of power 70 such as 115 volt, 60 Hertz alternating current is applied across a diode 72 and a voltage divider comprising a resistor 74 and parallel resistors 76 and 78. The diode 72-resistor 74 junction is connected through a resistor 80 to the source electrode of an unijunction transistor UJ–1 and across a resistor 82 to the source 70 return. The resistor 74-resistors 76 and 78 junction is connected through a diode 84 across a capacitor 86 to the trigger electrode of the transistor UJ–1, the drain electrode of which is connected to the source 70 return through a resistor 88.

The drain electrode of the transistor UJ–1 is also connected to the trigger electrode of a silicon controlled rectifier or SCR 90 through a capacitor 89. The trigger electrode of the SCR 90 is connected through a resistor 91 to the source 70 return and also through a resistor 92 to the cathode electrode of the SCR 90 and the charge (CH.) switch contact of one arm 94 of a double pole switch. The anode electrode of the SCR 90 is directly connected to the source 70.

Connected in series across the common terminals 96 and 97 of the double pole switch is a radiation emitting diode 98 and a resistor 100. The diode 97-resistor 100 junction is connected to the terminal 98 through the parallel combination of a resistor 102 and a capacitor 104 in series with the anode-cathode path of a second silicon controlled rectifier or SCR 106 and the contacts 108, 110 of a manually operable single pole switch.

The trigger electrode of the SCR 106 is connected to the common terminal 97 of the double pole switch through a capacitor 112. The trigger electrode of the SCR 106 is also connected through a resistor 114 to the slide wire or variable tap of potentiometer 116.

Also connected in series across the common terminals 96 and 97 of the double pole switch is a Zener diode 118 with a radiation emitting diode 120 and the potentiometer 116 earlier described. The common terminals 96 and 97 of the double pole switch are also connected respectively to terminals 122 and 124 to which the positive and negative terminals of a battery 126 to be charged may be connected.

The resistor 78 may be radiation responsive and may be enclosed within a radiation impervious enclosure with the radiation emitting diode 98 to insure that the impedance of the resistor 78 is solely responsive to the radiation emitted by the diode 98 by the exclusion of ambient radiation.

The SCR 90 is normally maintained in a nonconducting status by the interconnection of the anode and trigger electrodes thereof through the resistor 92. The application of the potential across the resistor 91 which results from the firing of the unijunction transistor UJ–1 is sufficient to insure the conduction of the SCR 90. The time at which conduction of the SCR 90, as earlier explained in connection with the circuit of FIG. 2, is initiated quite late in the positive half-cycles of the alternating current waveform due to the source-trigger electrode potential difference necessary for the transistor UJ–1 to conduct.

Figure 5:
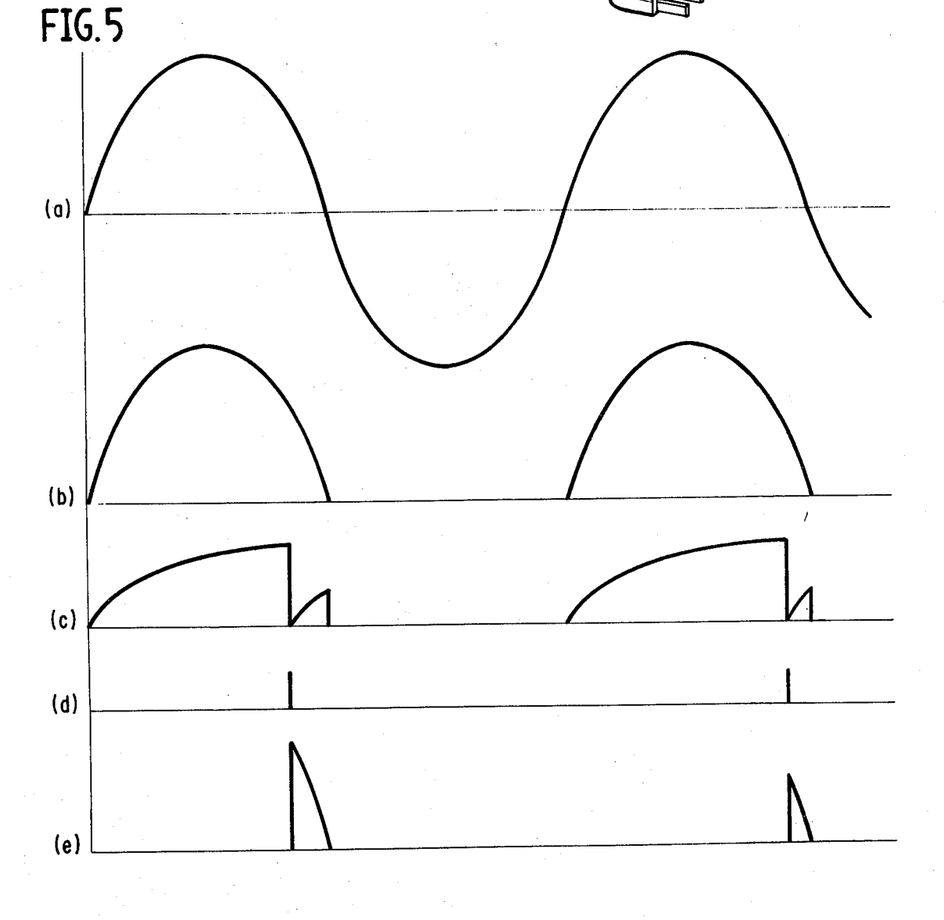
FIG. 5 is a timing diagram illustrating the waveform at selected places in the circuit of FIG. 4.

An understanding of the operation of the circuit of FIG. 4 may more readily be gained through reference to the waveform of FIG. 5. As shown in FIG. 5(a), the alternating current of waveform (a) is half-wave rectified by the diode 72 and is applied with reduced amplitude due to the voltage divider comprising resistors 80 and 82 to the source electrode of the transistor UJ–1 as waveform 5(b).

The alternating current signal illustrated in FIG. 5(a) is also reduced in amplitude by the voltage divider comprising resistor 74 and the resistor 76 and 78 parallel combination. The values of the various resistors are selected so that the signal applied through the diode 84 to the trigger electrode of the transistor UJ–1 as waveform 5(c) is less in amplitude than that of waveform 5(b). This insures that the potential on the trigger electrode of the transistor UJ–1 can never be sufficiently high relative to the potential applied to the source electrode thereof to trigger the transistor UJ–1 into conduction so long as the potential of waveform 5(a) is rising.

The potential of waveform 5(b) follows that of waveform 5(a) during the decline thereof in the second half of the positive half-cycle. However, the diode 84 prevents the charge accumulated on capacitor 86 from dissipating with a decline in the potential of waveform 5(a), and the resulting reduction of the potential difference between the potential of the source and trigger electrodes of the transistor UJ–1 ultimately results in the firing thereof. The firing of the transistor UJ–1 applies the pulse illustrated in waveform 5(d) through the capacitor 89 to the trigger electrode of the SCR 90 to initiate the conduction thereof for the remainder of the positive half-cycle of waveform 5(a) and to thereby provide the charging pulse illustrated in waveform 5(e) to the battery 126.

The battery potential, as measured by a voltmeter connected across the terminals 122 and 124 of the battery 126, also appears across the series combination of the Zener diode 118, the radiation emitting diode 120 and the potentiometer 116. The voltage drop across the Zener diode 118 is a relatively constant value such as 15 volts and the balance of the battery terminal voltage appears across the diode 120 and the potentiometer 116. The flow of current through the diode 120 effects the radiation therefrom and may be used to indicate the operation of the circuit in the fast charging mode as is illustrated in FIG. 1.

Since the current through the radiation emitting diode 98 divides between the resistors 100 and 102 and, since the effective resistance of a parallel circuit is less than that of either branch thereof alone, the current through the radiation emitting diode 98 will increase with the conduction of the SCR 106.

The increased radiation emitted by the diode 98 decreases the resistance of the radiation responsive resistor 78 thereby decreasing the resistance of the resistor 76-resistor 78 parallel combination and thus decreasing the charge which capacitor 86 attains each positive half-cycle. Because the peak charge of the capacitor 86 is thus reduced, the attainment of a sufficient potential difference to effect conduction of the transistor UJ–1 will occur later in the positive half-cycle of the alternating current of waveform 5(a) and the amount of current passed through the SCR 90 will ultimately be reduced to an average trickle current value of approximately 100 milliamperes.

The portion of the voltage across the potentiometer 116 picked off by the tap is applied through the thermister 114 and across the capacitor 112 to the trigger electrode of the SCR 196. When the voltage across the potentiometer 116 attains a value representative of a full charge of the battery 126, the voltage across the capacitor 112 will be sufficient to initiate conduction of the SCR 106 and place the circuit in the trickle charge mode. Once the SCR 106 conducts, the current through the radiation emitting diode 120 increases. An increase in the radiation emitted from the diode 98 decreases the resistance of the resistor 78 thereby reducing the charge which the capacitor 86 attains to effect a later firing of the transistor UJ–1 and the SCR 90.

Conduction of the SCR 106 also reduces the current through the diode 120 and the reduction in the emitted radiation which accompanies the reduction in current through the diode 120 may be seen as an indication of the trickle charge mode on the battery pack housing as illustrated in FIG. 1.

Operation of the Circuit (Trickle Charge Mode).

The switch in the cathode circuit of the SCR 106 is normally closed. The switch is necessary to stop the conduction of the SCR 106. Due to the positive anode voltage from the battery 126, the SCR 106 will remain conducting even after the transition of the charging circuit into the trickle charge mode in the absence of the opening of the switch. This is true even though the voltage across the terminals 122 and 124 of the battery 126 slowly decreases to a nominal value such as 12.5 volts from the value of approximately 14.5 volts maintained during the charging operation. As the battery voltage drops, the Zener diode 118 ceases to conduct thereby removing current through the diode 120 and extinguishing the radiation therefrom. The loss of the illumination may be utilized as indicated in FIG. 1 to indicate that the charging circuit is operating in the trickle charge mode.

Full Charge Verification

The switch may be operated manually to verify that the battery 126 is fully charged. The opening of the cathode circuit of the SCR 106 immediately interrupts conduction to again place the charging circuit in the rapid charge mode. The decreased current through the diode 98 will reduce radiation thereby increasing the resistance of the radiation responsive resistor 78. The charge on the battery 126 will rapidly increase in the rapid charge mode until the voltage across the terminals 122 and 124 of the battery 126 approaches 15.5 volts at which time the circuit will automatically revert to the trickle charge mode.

Isolation

As in the circuit of FIG. 2, the double pole switch is effective to isolate the charging circuit of the present invention from the alternating current source inasmuch as it is necessary to move the switch arms from the charge (CH.) position through the OFF position to a USE position from which the charge on the battery 126 may be utilized. There is thus no possibility that the direct current terminals will be subjected to a surge of current from the alternating current source 70 during one of the positive half-cycles thereof. Protection to personnel utilizing the circuit is also afforded since the source 70 is removed from the battery and any circuit connected thereto.

Battery Charge Theory

The phenomenon of the present invention is not completely understood. In the example described above in which a ten cell sub-C Ni-Cad battery connected to a 115 volt, 60 Hertz power supply, the peak value of the voltage drop across the battery rises to about 2.5 volts per cell. This value is much higher than that of the 1.8 volts at which gas evolution is generally expected to begin. It is suspected that the rate at which the gas forms is incapable of rising sufficiently during the short pulse duration thereby permitting a much higher peak voltage without gas evolution.

As an alternative theory, it is possible that the gas absorbs very rapidly because the pressure within the sealed battery rises to only about 8 percent of the pressure which would result from charging the battery with full-wave rectified 60 Hertz current at the same average value. The temperature rise is only about 10° F as compared with about 6° F with the use of a transformer in a full 15 minute charge.

It is also possible that the nickel atoms are being driven into a higher valence state, e.g., 6 or 7, during the brief high peak current interval for subsequent spontaneous discharge into the more stable lower valence states, e.g., 2 or 3, during the quiescent intervals between the application of charging current pulses. In such event, this discharge occurring within the cells as a result of the inherent electro-chemical mechanism may be responsible for the low gas evolution even through subjected to very rapid charging.

In any event, the high peak current results in a depth of penetration of the charge far in excess of the customary surface charge accumulation and subsequent charge migration internally of the battery plates.

Figure 6:
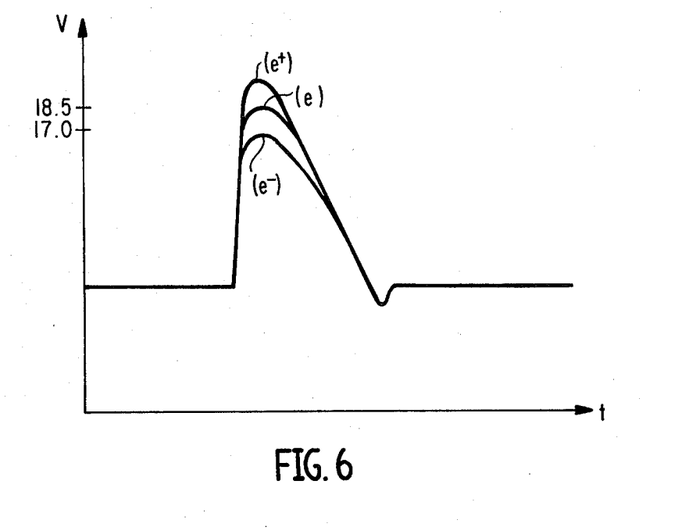
FIG. 6 is an expanded illustration of one of the waveforms of FIG. 5 showing the responsiveness thereof to the radiant energy control system; and, FIG. 7 is a timing diagram illustrating the variance in the waveforms at selected places in the circuit of FIG. 4 in the "fast charging" and "trickle charging" modes.

With reference to FIG. 6, one of the charging pulses of waveform (e) of FIG. 5 is illustrated together with plus and minus 25% variations from a nominal 115 V., 60 Hz. at terminal 96 of the circuit of FIG. 4, i.e., waveforms ($e^+$) and ($e^-$) respectively. These variations in current through the radiation emitting diode 98 yield corresponding variations in the resistance of the radiation responsive resistor 78, the resistance of which will drop suddenly in response to a bright flash but which will recover relatively much slower even in darkness. This characteristic is utilized to inhibit the triggering of the transistor UJ–1 following strong line transients. The desired average trickle current results from the delay in gating time which in turn results from the additional current pulled through the diode 98 through the resistor 102 upon the conduction of the SCR 106.

The Zener diode 118 does not conduct at the quiescent level of the battery 126, but will conduct when the battery voltage level is elevated by charging current pulses to trigger the SCR 106. Premature transition to the trickle mode is prevented by the removal of fast transients by the resistor 114 and the capacitor 112.

With continued reference to waveform (e) of FIG. 6, the rapid rise portion up to about 17 volts represents battery terminal voltage response to an applied voltage by SCR 90 firing with about a 1 microsecond turn on time. Note that while the source voltage illustrated in waveform 5(a) is always decreasing during the conduction interval of SCR 90, the battery terminal voltage rise becomes relatively gradual from 17 to about 18.5 volts before declining with the voltage of the source 70. The rapid rise to 17 volts is believed to correspond to the potential barrier maintained by the cells (polarization products), and further that the gradual slope from 17 to 18.5 volts results from the high surge current which flows once the potential barrier is exceeded.

The above described mechanism can explain the differences observed in internal gas pressure with this charging method compared with equal average current rates using full wave rectified current. Recharging is not effective internal to the cell until ions migrate into the interior of the matrix of the active material. The effects of polarizing influences which result in potential barriers would require that the applied voltage exceed some threshold value to maintain a given average current with direct current or a slowly varying applied voltage having a narrow amplitude variation. Should that threshold value exceed the value marking onset of gas evolution, gas would form continually and the pressure would continually rise. If, however, the potential barrier is overcome almost instantly as indicated in the waveforms of FIG. 6 so that effective charging current flows essentially throughout the pulse interval, minimal gas evolution would result and whatever oxygen might be released could be recombined during the relatively long quiescent intervals between charging pulses.

By way of example, a dead 10-cell, Sub C (1 ampere hour) battery has been fully charged by the present invention in 15 minutes with an average pressure rise of from 0.4 to 0.6 pounds per square inch. Using conventional full wave rectified current, the pressure rise in fully charging such a battery has been observed to range from 5 to 15 pounds per square inch.

Figure 7:
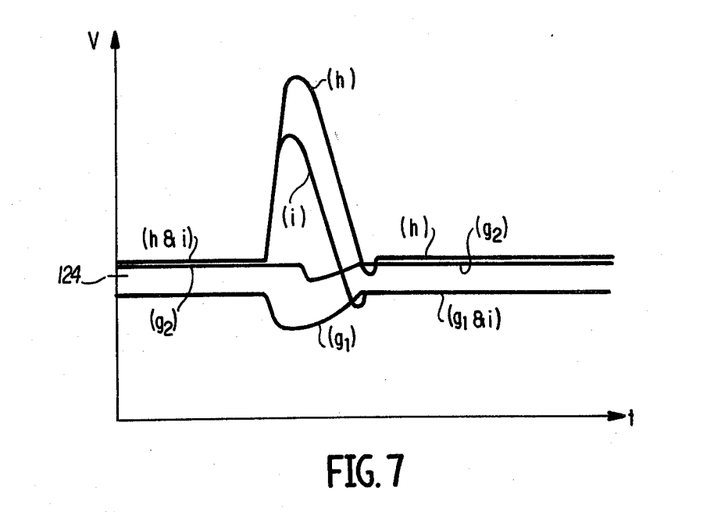

Attention is also invited to the waveforms of FIG. 7 which appear at the indicated locations in the circuit of FIG. 4. With reference to FIG. 7, the waveform ($g_1$) illustrates the voltage on the capacitor 112, i.e., the voltage applied to the trigger electrode of the SCR 106, in the fast charge mode with the SCR 106 nonconducting. The waveform ($g_2$) illustrates the voltage at the same point in the circuit of FIG. 4 in the trickle charge mode with the SCR 106 conducting. Conduction of the SCR 106 is interrupted by the operation of the switch connecting the cathode terminal 108 to the source 70 return. The simultaneous shorting of the trigger electrode discharges the capacitor 112 thereby preventing the triggering of the SCR 106 by contact noise when the switch arm is returned to the cathode contact 108.

ADVANTAGES AND SCOPE OF THE INVENTION

As is readily apparent from the foregoing, the integrated battery and charging circuit of the present invention achieves isolation of the direct current output terminals from the alternating current source through the use of a simple mechanical switch thereby eliminating the necessity for large, heavy and expensive transformers. Moreover, the method of charging permits the utilization of a Ni-Cad battery pack where relatively slow discharge ratio can be expected by rapidly charging the battery even to replenish small amounts of energy expended.

The system of the present invention can be described as comprising 5 sub-systems. The first sub-system is the battery comprising a number of sealed Ni-Cad cells which are connected in series by low resistance leads. The terminals of this battery provide conduction paths for current flow into and out of the battery for recharging and discharging and also provides information related to the internal resistance (dynamic) of the cells by the monitoring of the open circuit battery voltage when no current is flowing as well as the voltage resulting from a controlled current flow. In general this dynamic resistance is relatively high when cells are discharged, decreases rapidly as partial charge is restored, then decreases more gradually as mid-charge is reached, finally increasing gradually again toward full charge and increasing rapidly as overcharge progresses.

The second sub-system is a controlled switch in series with the 60 Hz., 115-volt power source and the battery. This switch conducts very late in the positive going half-cycles to pass charging current through the battery until the source voltage falls below the battery voltage. The third sub-system controls the gating of this switch by sensing the polarity and magnitude of the source voltage and differentially comparing the sensed values with their time integral to produce a trigger pulse output when a preset level is reached.

The time constant of the integration may be varied by a signal from the fourth sub-system to effect charging current regulation. A photo sensitive resistance, which may be part of the integrator, is desirably used because of a photon integration characteristic. While the trigger generating circuit is intrinsically insensitive to line voltage transients, an early trigger resulting from an unusually high transient may yield a single brief photon burst from the fourth sub-system which, through the impingement thereof on the integrating photo resistance in the third sub-system, will rapidly cause the integrator input amplitude to decrease to thereby inhibit trigger generation for a few seconds. The photo resistor will then gradually increase resistance until normal controlled current charging is resumed. Nearly constant increments of charge are thus introduced into the battery during each cycle of the alternating current source.

The fifth sub-system senses the polarity and magnitude of the voltage between the battery terminals and differentially compares a fraction thereof with a preset reference voltage level. The fraction of voltage feeding into the comparator comprises essentially that increment of voltage in excess of the battery terminal voltage which obtains until a fully charged status is reached at which time the circuit automatically changes the resistance in series with the photon generator of the fourth sub-system to increase its radiation output and to reduce the charging current to the trickle rate. The circuit latches in the trickle mode until manually reset to the fast charge mode. A second radiation emitting diode is conveniently utilized to indicate the mode of operation.

Isolation is provided by an enclosure which completely surrounds all circuit and battery conductors. The double pole, three-position switch selectively connects the battery to either the charging circuit, to nothing, or to the output terminal posts. The power line circuits are thus never continued to either output terminal and the safety of operating personnel is thus assured.

The novel charging method of the present invention permits the rapid attainment of a deep charge without an excessive temperature rise and without the danger of venting as a result of gas evolution. By confining the application of charging current to brief periods, the average current can be markedly increased without danger to the battery through an increase in peak amplitude. The superior characteristics of Ni-Cad batteries with respect to the number of cycles of service with repeatable characteristics can be utilized through the novel method described.

The present invention may thus be embodied in other specific forms without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of charging a battery comprising the steps of:
   a. generating a periodic time varying unidirection charging current;
   b. generating a first signal related to the peak value of each cycle of the charging current;
   c. generating a second signal related to the instantaneous value of each cycle of the charging current and a characteristic of the battery being charged;
   d. gating a portion of the charging current to the battery to be charged in dependency on the first and second signals; and;
   e. varying the relationship of the second signal to the instantaneous value of the charging current as a function of the battery terminal voltage.

2. Apparatus comprising:
   a battery;
   a source current;
   means including an SCR for applying charging current from said source to said battery;
   means for providing a first signal related to the voltage of said source;
   means for providing a second signal related to the integral of said first signal with respect to time;
   means for providing a third signal related to battery terminal voltage and for modifying said first signal responsively thereto; and,
   means for differentially comparing said first and second signals and for triggering said SCR responsively thereto.

3. The apparatus of claim 2 wherein said modifying means includes a radiation emitting element; and,
   wherein said second signal providing means includes a radiation responsive element in a radiation receiving relationship to said radiation emitting element.

4. The apparatus of claim 3 including means impervious to radiation from said radiation emitting element for enclosing said radiation emitting element and said radiation responsive element whereby said radiation responsive element is responsive only to radiation from said radiation emitting element.

5. The apparatus of claim 4 including:
   means for providing a fourth signal related to battery terminal voltage;
   means for providing a reference signal;
   means for comparing said fourth signal with said reference signal and for modifying said third signal responsively thereto.

6. The apparatus of claim 2 including:
   means for providing a fourth signal related to battery terminal voltage;
   means for providing a reference signal;
   means for comparing said fourth signal with said reference signal and for modifying said third signal responsively thereto.

7. Apparatus comprising:
   a pair of input terminals adapted to receive alternating current power;
   means for sensing a characteristic of a battery being charged;

means including an SCR for applying unidirectional current from said pair of terminals to said battery;
a capacitor;
means for providing a direct current signal related to the power received by said pair of input terminals and for applying said direct current signal to charge said capacitor; and,
voltage responsive switch means responsive to the charge on said capacitor and to a signal related to the instantaneous voltage of the power received by said pair of input terminals and to the characteristic sensed for initiating the conduction of said SCR.

8. The apparatus of claim 7 wherein said characteristic is battery terminal voltage.

9. Apparatus comprising:
a pair of input terminals adapted to receive alternating current power;
means for sensing battery terminal voltage;
means including an SCR for applying unidirectional current from said pair of terminals to said battery;
a capacitor;
means for providing a direct current signal related to the power received by said pair of input terminals and for applying said direct current signal to charge said capacitor; and,
voltage responsive switch means responsive to the charge on said capacitor and to a signal related to the instantaneous voltage of the power received by said pair of input terminals and to the characteristic sensed for initiating the conduction of said SCR, said battery terminal voltage related signal providing means including a radiation emitting element and switch means in series across said battery, and means for providing a control signal also related to battery terminal voltage, said switch means being responsive to said control signal to modify the current through said radiation emitting means,
said direct current signal providing means including a radiation responsive element in a radiating receiving relationship to said radiation emitting element.

10. The apparatus of claim 9 wherein said radiation emitting element is responsive only to radiation from said radiation emitting element.

11. A method of charging a battery comprising the steps of:
a. providing a battery to be charged;
b. applying alternating current power to a pair of input terminals;
c. applying power from the pair of input terminals to the battery to be charged through an SCR;
d. providing a capacitor;
e. at least half wave rectifying the power applied to the pair of input terminals to provide a charging current related to the power applied to the input terminals;
f. applying the charging current to the capacitor to provide a signal related to the voltage thereon;
g. providing a time varying signal related to the instantaneous value of the alternating current power;
h. providing a signal related to battery terminal voltage;
i. modifying the relationship of the charging current to the alternating current power responsively to the battery terminal voltage related signal;
j. comparing the capacitor voltage related signal with the instantaneous power related signal to provide a control signal; and,
k. triggering the SCR responsively to the control signal.

* * * * *